LOAD-ELONGATION CURVES
DRY STATE

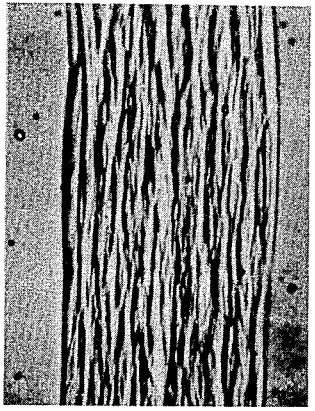
(A)
GROUP I
(FILAMENT A)
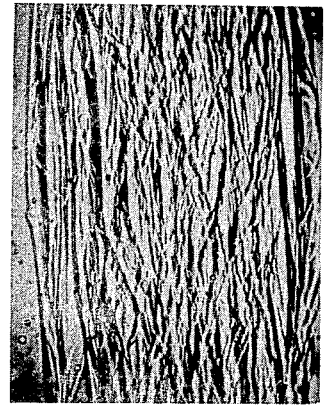
(B)
GROUP II
(FILAMENT C)
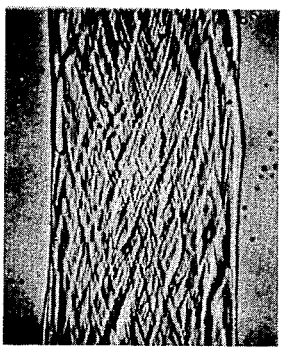
(C)
GROUP III
(FILAMENT D)
PRESENT INVENTION
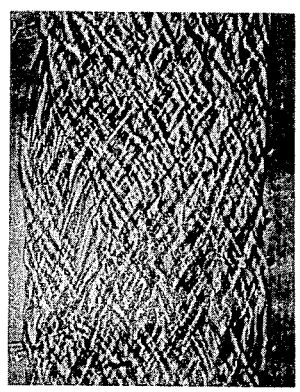
(C')
GROUP III
(FILAMENT E)
PRESENT INVENTION
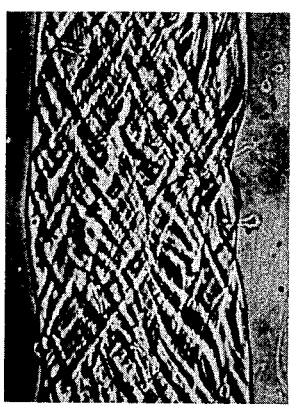
(C'')
GROUP III
FILAMENT F)
PRESENT INVENTION
(D)
COTTON
FIG. 2
FIBRILLAR ARRANGEMENT

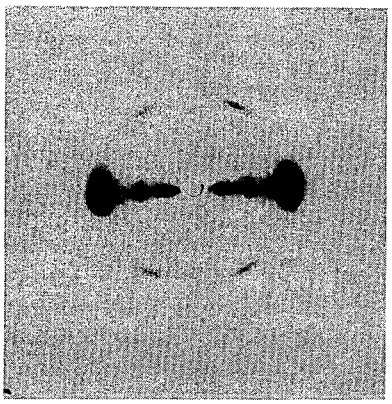
GROUP I
(FILAMENT A)
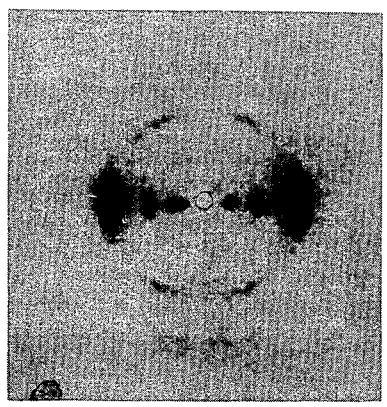
GROUP II
(FILAMENT C)
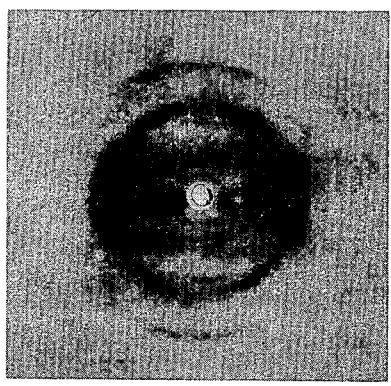
GROUP III
(FILAMENT D)
PRESENT INVENTION
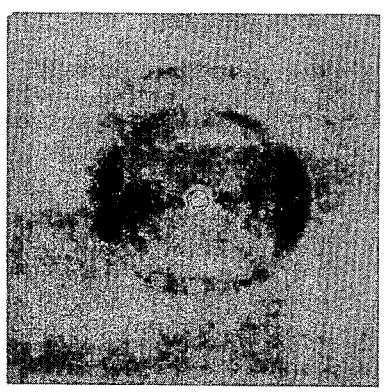
GROUP III
(FILAMENT E)
PRESENT INVENTION
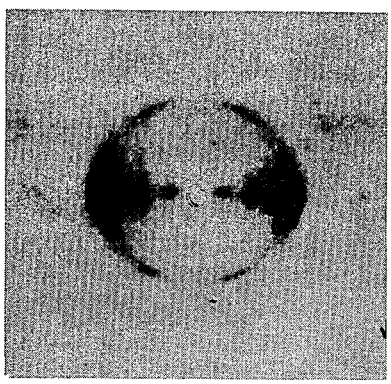
GROUP III
(FILAMENT F)
PRESENT INVENTION
FIG.3
X-RAY DIAGRAMS
(SHOWING ORIENTATION ANGLE)

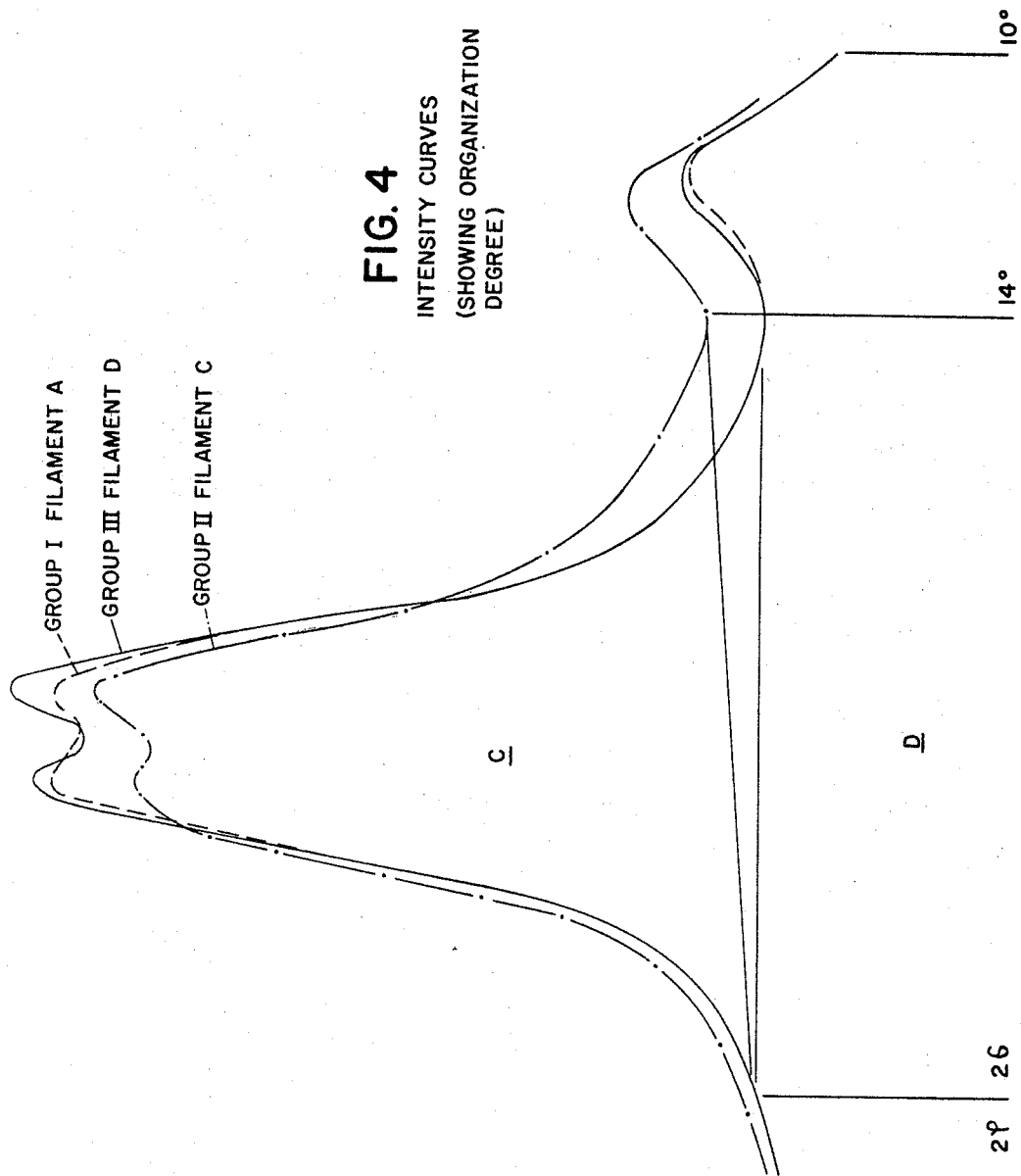

LOAD-ELONGATION CURVES
WET STATE

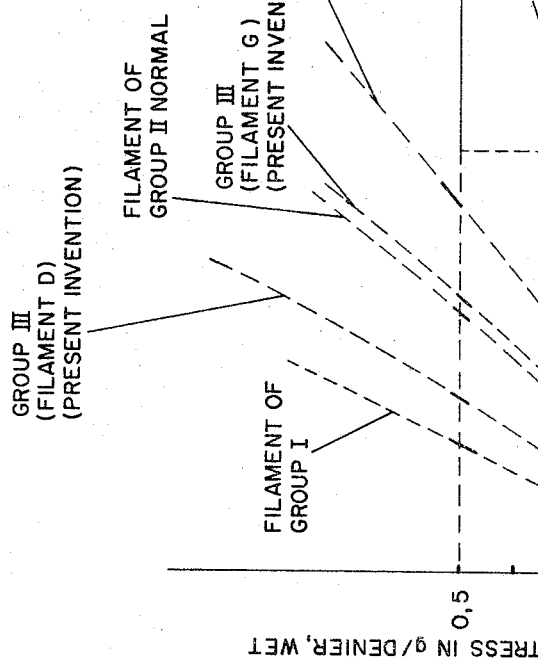

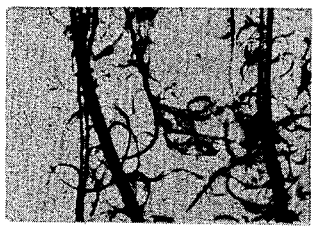
A - 18 MINUTES
GROUP I
(FILAMENT A)
A' - 36 MINUTES
B - 18 MINUTES
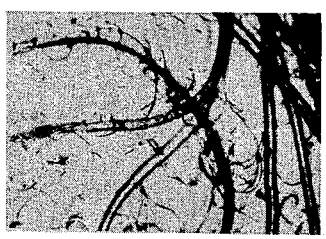
GROUP II
(FILAMENT G)
B' - 36 MINUTES
C - 18 MINUTES
GROUP III
(FILAMENT D)
PRESENT INVENTION
C' - 36 MINUTES
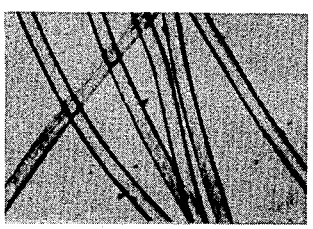
D - 18 MINUTES
GROUP III
(FILAMENT E)
PRESENT INVENTION
D' - 36 MINUTES
E - 18 MINUTES
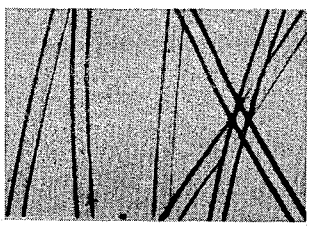
GROUP III
(FILAMENT F)
PRESENT INVENTION
E' - 36 MINUTES
FIG.7
FIBRILLATION United States Patent Office 3,432,589
Patented Mar. 11, 1969

3,432,589
PROCESS FOR MANUFACTURING REGENERATED CELLULOSE FILAMENTS
Nicolas B. Drisch, Paris, France, assignor to Chimiotex, S.A., Geneva, Switzerland, a corporation of Switzerland
Continuation-in-part of applications Ser. No. 595,563, Nov. 15, 1966, and Ser. No. 637,986, May 12, 1967. This application Feb. 16, 1968, Ser. No. 706,030
Claims priority, application Ireland, Nov. 6, 1967, 1,326/67
U.S. Cl. 264—197
Int. Cl. D01d 3/28
15 Claims

ABSTRACT OF THE DISCLOSURE

A process for the production of alkali resistant regenerated cellulose filaments which comprises spinning into a dilute acid spinning bath at a temperature below 40° C., a viscose which contains a cellulose whose DP is at least 400, having a gamma index of between 60 and 100 and a viscosity greater than 300 poises wherein gel filaments are produced then subjecting the gel filament to a first 30–80% stretching operation outside the bath, and simultaneously subjecting said filaments to a squeezing action so as to remove from the gel filaments the adhering acid bath, the gamma index ($\gamma_1$) of the thus stretched and extracted gel filaments being between 28 and 40, their swelling index G being between 5 and 8; and the acid concentration $a$ of the liquid extracted from the gel filaments being between 6 and 9.5 g./liter, and thereafter subjecting the extracted gel filaments to a second 0–100% stretching operation in air then relaxing the filaments of from 8 to 20% of their length, and finally completing the regeneration of the filaments in a hot dilute acid bath.

The invention further relates to a process for producing novel alkali resistant cellulose regenerated filament having a new fibrillary arrangement different from that of other alkali resistant cellulose regenerated filaments, characterized by a crossed position of the fibrils constituting the filament, having an orientation angle of about 35° to about 47° and an organization degree of from about 0.42 to about 0.48; in addition this invention related to an alkali resistant regenerated cellulose filament having a conditioned tenacity of about 3.5 to 7 g./den., a conditioned elongation of about 30–14%, a wet tenacity of about 2.7–6 g./den. a wet elongation of about 40–16%, a work product in the conditioned state of about 70 to about 115 and a work product in the wet state of about 70 to about 115; further, this invention relates to a process for producing alkali resistant regenerated cellulose filaments having a loop tenacity of about 1.2 to about 2.1 g./den., a water filtration number of about 3 to about 10 and a dyeing index of about 1.15. In addition this invention relates to a prcoess for producing the corresponding acetylated cellulose filaments.

The present application is a continuation-in-part of application Ser. No. 595,563 filed Nov. 15, 1966 and now abandoned, and of application Ser. No. 637,986 filed May 12, 1967 and now abandoned.

The present invention relates to novel regenerated cellulose filaments and to a novel viscose spinning process for their manufacture. More particularly, this invention relates to a process for producing novel alkali resistant regenerated cellulose filaments, fibers, threads and yarns and to a process for their manufacture, said filaments having outstanding and unexpected properties, in particular the following properties:

(a) a new fibrillary arrangement different from that of the other artificial fibers, and characterized by a "crossed" position of the fibrils constituting the filaments;
(b) relatively high tenacity together with relatively high elongation;
(c) an exceptional energy level (to be defined hereinafter) and consequently a very high toughness;
(d) excellent transverse strength which is expressed by a high loop resistance and characterized by a high resistance to fibrillation.

Conventionally alkali resistant regenerated cellulose filaments are obtained, as is well known, by spinning viscoses which possess a high gamma index and viscosity, and which contain a high DP cellulose, into cold baths having a low acid concentration. The formed filaments may be stretched in air and/or in the first bath, and they are then regenerated in a second hot diluted acid bath. The filaments obtained according to processes of the type described have advantageous properties in comparison with ordinary regenerated cellulose filaments. The alkali resistant regenerated cellulose filaments have conditioned and wet tenacities that are much superior to those of ordinary rayons. The ratio of wet-conditioned tenacities of the presently known regenerated cellulose filaments of this type attain 75 to 80%. These filaments have a high modulus of elasticity in the wet state which imparts to the corresponding fabrics an excellent dimensional stability. In addition, the filaments have a very characteristic microfibrillar structure, which is only slightly affected by 5% caustic soda solutions whereas ordinary textile rayons and high tenacity rayon tire yarns treated with a 5% soda solution under the same conditions become greatly damaged.

More specifically, the term "alkali resistant" as used throughout the present disclosure relates to regenerated cellulose filaments which after treatment with a 5% caustic soda solution at 20° C. for 15 minutes, followed by rinsing and complete neutralization, have an elongation in the wet state lower than 8% under a load of 0.5 g./den. This elongation is measured on a single filament and in fact represents a modulus of elasticity.

In addition, the term "filament" which is widely used throughout the present disclosure means not only "filaments" but equally "fibers," and other shaped structures obtained from viscose.

All the characteristics enumerated above impart to the finished articles made from alkali resistant regenerated cellulose filaments remarkable properties, in particular, dimensional stability through repeated laundering, mercerization resistance, and a better than average ability to take up resin finishing treatments.

The compared characteristics of alkali resistant regenerated cellulose filaments, high-tenacity rayons for industrial applications, and ordinary textile rayons have been described in numerous articles in the literature, for example, in Reyon Zellwolle 1959, v. 7, pp. 431–436, and Svensk Pepperstindning 1962, v. 4 pp. 118–121. These articles disclose differences that distinguish alkali resistant regenerated cellulose filaments from the usual or ordinary regenerated cellulose filaments. In fact, alkali resistant regenerated cellulose filaments are closer in structure to cotton than to the usual, or ordinary rayons.

A large number of processes are known for the manufacture of alkali resistant regenerated cellulose filaments. During the first period of development that extended from 1943 to 1959, a certain number of pioneer parents were granted. However, in spite of their advantageous properties, filaments produced in accordance with the prior art teachings still have tenacity and elongation properties that are relatively inadequate for the present day requirements of the textile industry, and they also present low loop and knot strengths. Therefore, especially since 1960, new processes have been developed that make it possible to improve the longitudinal properties of these filaments without sacrifice of the transverse properties. As an alternative these processes have made it possible to obtain higher loop tenacities and greater elongation without any loss of the initial tenacity characteristics.

The filaments obtained according to the most recent of these processes generally have higher tenacities, but their elongations are substantially the same, and their transverse properties have not been substantially improved. Some of the most recent processes are based on the addition of formaldehyde to the viscose immediately prior to spinning, or to the dilute spinning bath, in order to obtain stable xanthate complexes and to be able to increase the stretching and orientation of the filaments in the gelled state. It is well known by skilled workers in this art that spinning in the presence of formaldehyde entails some very serious difficulties and consequently these prior art processes are not successfully exploited commercially. Furthermore, the prior art processes often involve a very high axial orientation and it is necessary to utilize swelling treatments in intermediate baths in the course of spinning, or after spinning, to improve the transverse resistance of the filaments. The swelling treatments are carried out with solutions of caustic soda, or other alkaline agents and they have the disadvantage of yielding irregular results, thereby seriously complicating industrial production of alkali resistant regenerated cellulose filaments.

If the mechanical characteristics of the filaments of the alkali resistant type described and produced in the prior art are examined, it is observed that the filaments can be classified into the following two groups:

GROUP I
Filaments with very high tenacity and a low-breaking elongation

These filaments are generally obtained according to processes in which the spinning is effected in the presence of formaldehyde and they have conditioned tenacities of from about 4 to about 10 g./den. with conditioned elongations of from 8 to 4%. Said filaments have an excess of tenacity that serves no purpose, but on the other hand, they have an insufficient elongation. In addition, they have low loop resistance and they readily fibrillate.

When these filaments are examined by the conventional X-ray techniques, it is observed that they have a low orientation angle (the crystallites are highly oriented in relation to the axis of the filaments) and a high degree of organization.

GROUP II
Filaments which have relatively low tenacity and relatively high breaking elongation That is, these filaments have conditioned tenacities from 3.5 to 4.5 g./den. and corresponding elongations of 13 to 11%. In this second group, there are also the so-called "improved" filaments which have higher tenacities without loss of elongation, said filaments having a conditioned tenacity of from 5 to 5.5 g./den., and their elongation remaining substantially the same. This entire group, therefore, comprises filaments having a conditioned tenacity ranging from 3.5 to 5.5 g./den. and a conditioned elongation of 13 to 11%. Their transverse strength, although better than that of filaments of the first group, is nevertheless not satisfactory for commercial textile purposes for producing fabrics of good overall performance with respect to their wearing characteristics.

When these filaments are examined by conventional X-ray techniques, it is observed that they have a higher orientation angle (the crystallites are less oriented in relation to the axis of the filaments) and a much lower degree of organization.

In accordance with the novel and unobvious method which will be described hereinafter there are obtained the novel alkali resistant regenerated cellulose filaments of the present invention, which filaments possess outstanding and unexpected properties not heretofore available in the regenerated cellulose filaments of the prior art such as those illustrated in Groups I and II.

Therefore, it is a primary object of the present invention to provide a novel and unobvious third group of alkali resistant regenerated cellulose filaments and a method for their manufacture, wherein said filaments have an orientation angle of about 35° to about 47° and an organization degree of from about 0.42 to about 0.48.

It is a further object of the present invention to provide novel and unobvious alkali resistant regenerated cellulose filaments and a method for their manufacture, wherein said filaments have an entirely new structure characterized by a crossed position of the fibrils relative to the axis of the filament.

Still a further primary object of the present invention is to provide novel and unobvious alkali resistant regenerated cellulose filaments and a method for their manufacture, wherein said filaments have a conditioned tenacity of about 3.5–7 g./den., a conditioned elongation of about 30–14%, a work product in the dry state of about 70 to about 115, and a work product in the wet state equally of about 70 to about 115.

A further object of the present invention is to provide novel and unobvious alkali resistant regenerated cellulose filaments and a method for their manufacture, wherein said filaments have in addition to a dry elongation of 30–14%, and to a wet elongation of 40–16%, a dry loop tenacity of about 1.2 to about 2.1 g./den.

Another object of the present invention is to provide novel and unobvious alkali resistant regenerated cellulose filaments and a method for their manufacture, said filaments being substantially non-fibrillatable and having a water filtration number of about 3 to about 10.

Still another object of the present invention is to provide novel and unobvious alkali resistant regenerated cellulose filaments and a method for their manufacture wherein said filaments have a dyeing index of about 1.15.

It is still a further object of the present invention to provide an acetylated cellulose filament having a conditioned tenacity of about 3 to 5 g./den., a wet tenacity of about 2.3 to 3.6 g./den., a conditioned elongation of about 27 to 14%, a wet elongation of about 38 to 17%, a wet modulus of about 1.6 to 0.6%, and a conditioned loop tenacity of about 1.9 to 0.8 g./den.

It is still a further object of the present invention to provide a fabric formed of the novel regenerated cellulose filament of the subject invention.

Still another object of the present invention is to provide a resin finished fabric wherein said fabric is formed of the novel regenerated cellulose filaments of the present invention.

Still another object of this present invention is to provide a fabric formed of the novel acetylated cellulose filaments of the present invention.

Other objects and advantages of this invention will be apparent from the following description.

To illustrate the unexpected nature of the novel regenerated cellulose filaments of the present invention, reference is hereby made to FIGURES 1, 2, 3, 4, 5, 6, 7 and 8 wherein all filaments of Groups I, II and III belong to the alkali resistant type.

FIG. 2(A) illustrates the structure of an ordinary, highly oriented regenerated cellulose filament of Group I (filament A).

FIG. 2(B) illustrates the structure of an improved regenerated cellulose filament of Group II (Filament C).

FIG. 2(C) illustrates the entirely new structure of a filament of Group III of the present invention (Filament D).

FIG. 2(C') illustrates also the new structure of another filament of the present invention, Group III (Filament E).

FIG. 2(C'') illustrates also the new structure of another filament of the present invention, Group III (Filament F).

FIG. 2(D) illustrates the structure of cotton.

FIG. 3 represents X-ray diagrams showing the diffraction arcs of filament A of Group I (highly orientated regenerated cellulose filament), of filament C of Group II (improved regenerated cellulose filament), and of filaments D, E and F of Groups III (the novel regenerated cellulose filaments of the present invention).

FIG. 4 represents the curves of intensity obtained at different angles with an X-ray goniometer, showing the organization degree for filament A of Group I, filament C of Group II and filament D of Group III.

Figure 1:
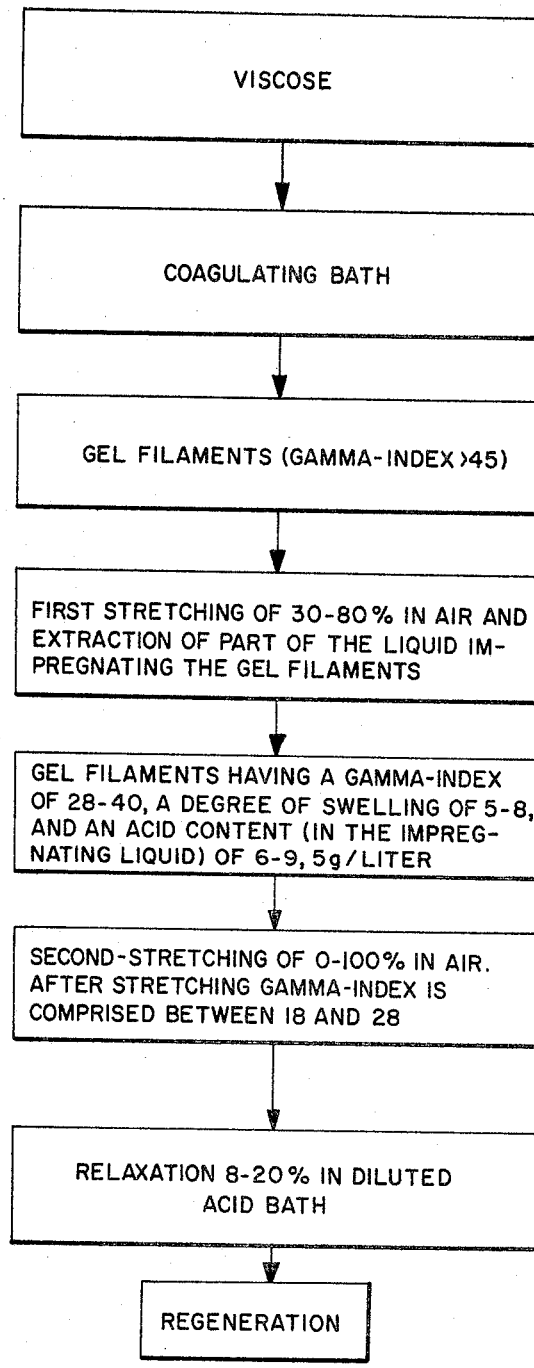
FIGURE 1 is a flow sheet schematically illustrative of the novel and unobvious process of the present invention for preparing the novel alkali resistant filaments described herein.
Figure 5A:
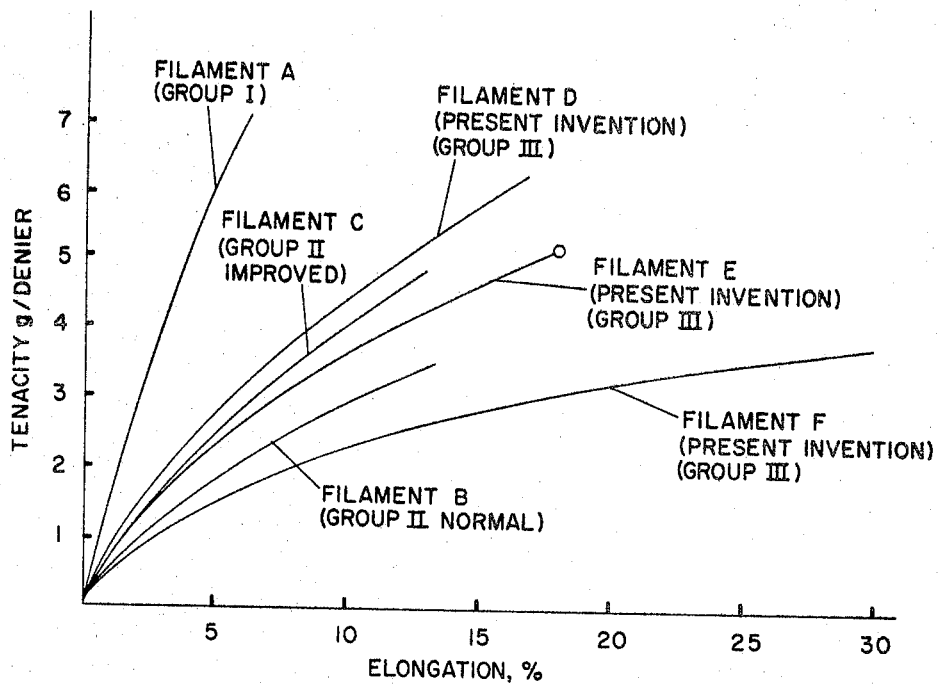
Figure 5B:
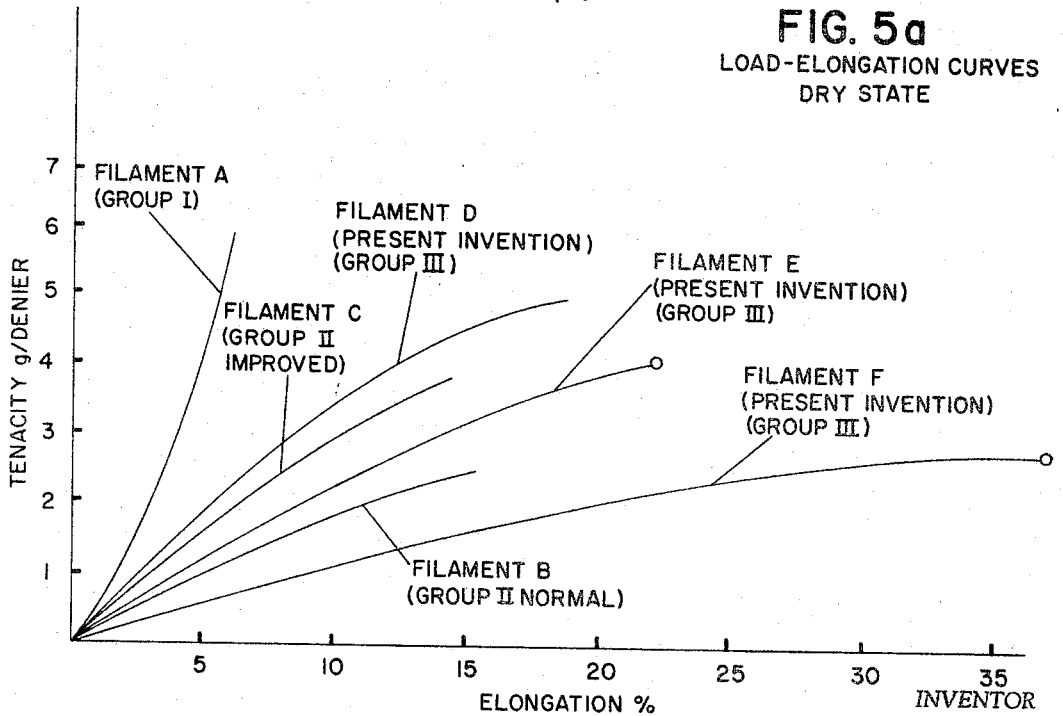

FIG. 5a and FIG. 5b are tenacity-elongation curves respectively in the conditioned and in the wet states, illustrating the advantages of the alkali resistant regenerated cellulose filaments D, E and F of the present invention over those alkali resistant regenerated cellulose filaments A, B and C produced in the prior art. FIG. 6 illustrates the wet modulus of the filaments produced in the prior art (Groups I and II), of the filaments D, F and G of the invention (Group III), and of other different types of cellulose regenerated filaments, after treatment of all these filaments with a 5% caustic soda solution.

FIGS. 7A and A' illustrate that with known regenerated cellulose filaments of Group I, numerous fibrils are formed after 18 and 36 minutes of vigorous beating in a mixer.

FIGS. 7B and B' illustrate that with known regenerated cellulose filaments of Group II, still numerous fibrils are formed after 18 and 36 minutes of vigorous beating in a mixer.

FIGS. 7C and C' illustrate the beginning fibrillation of the alkali resistant regenerated cellulose filaments D of the present invention after 18 minutes of vigorous beating in a mixer, as well as fibrillation of the filaments after 36 minutes of vigorous beating in a mixer.

FIGS. 7D and D' and FIGS. 7E and E' illustrate that there is practically no fibrillation with filaments E and F after 18 and 36 minutes of vigorous beating in a mixer.

Figure 8:
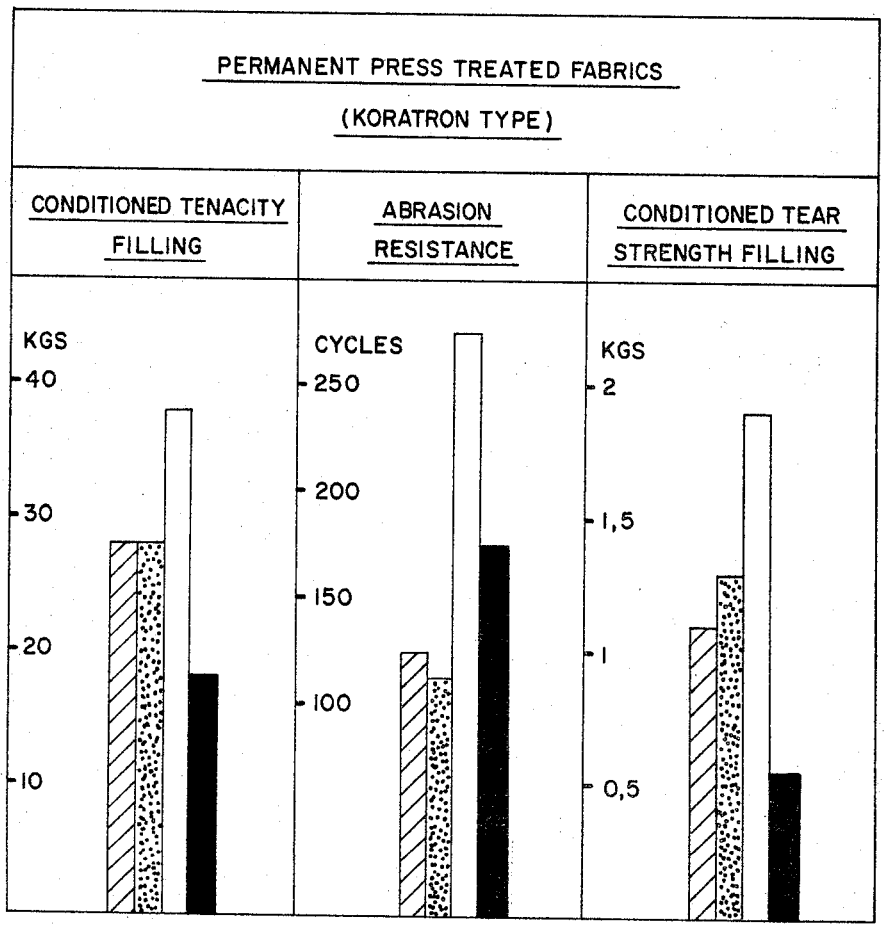

FIG. 8 is a chart illustrating the different properties of fabrics prepared from the regenerated cellulose filaments of the Groups I, II, III and cotton wherein the same have been given a wash and wear finishing treatment.

Turning now more specifically to FIGURES 2(A), 2(B), 2(C), 2(C'), 2(C'') and 2(D) wherein the novel alkali resistant filaments of the present invention are compared with the prior art filaments, FIG. 2(A) shows that for the ordinary highly oriented filament A of Group I, the fibrils are substantially parallel and closely packed against one another, and this structure is responsible for low elongation, low modulus of elasticity, low work to rupture, high tendency to fibrillation, etc.

FIG. 2(B) shows that for filament C of Group II the fibrils are not in a substantial parallel relationship and are irregularly arranged over the whole cross section of the filament.

FIGS. 2(C), 2(C') and 2(C'') show the new structure of the alkali resistant filaments D, E and F of Group III of the present invention, and, in particular the crossed position of the fibrils relative to the axis of the filaments. This structure is characterized by an assemblage of perfectly well defined fibrils which are regularly arranged over the whole cross section of the filaments, but are angularly disposed in respect of the axis of the filaments.

Such a macrostructure causes an entanglement of the fibrils which considerably increases the cohesion of the filaments of this invention.

It is this new structure which is responsible for the superior and unexpected properties of the alkali resistant filaments D, E and F of the present invention, and, in particular, for the relatively high elongation at rupture and the relatively high tenacity, and therefore for the considerable improvement of work to rupture. This new structure is also the reason for the high wet tensile strength, the high wet modulus of elasticity, as well as the high resistance to fibrillation.

FIG. 2(D) illustrates comparatively the known structure of the cotton filament with the spiral arrangement of the fibrils relative to the axis. It is clear from FIGS. 2(A), 2(B), 2(C), 2(C'), 2(C'') and 2(D) that the fibrillary structure of the filaments of Group III is much closer to the structure of cotton than the structure of the filaments of Group I and Group II is to cotton.

The photographs of FIGS. 2(A), (B), (C), (C'), (C'') and (D) were taken on filaments of Groups I, II, III and cotton, swollen in 70% nitric acid, and then slightly disintegrated by crushing.

The novel filaments produced in accordance with the present invention have a mean orientation angle in the range of 35°–47°.

The orientation angle may be defined as being the mean angle which results from the mean orientation of the crystallites in the fibrils and from the mean orientation of the fibrils in relation to each other. The orientation angle is usually determined from X-ray diagrams by analysis of the curves which represent the distribution of the energy diffracted along arc 002. This orientation may be defined in particular by the angle $2\alpha$, $\alpha$ being the half-maximum angle, that is, the angular length in degrees of the measured interference arc at half-maximum intensity, after correction for background intensity. This method is reported, for example, in "Physical Methods in Chemical Analysis" by W. G. Berl, Volume 1, 1950 Academic Press, Incorporated, Publishers, New York.

The filaments of group III produced in accordance with the present invention, as well as filaments of groups I and II, were examined in accordance with the method outlined above and the X-ray diagrams obtained from filaments A and C of groups I and II and from filaments D, E, and F of group III represented in FIGURE 3. FIGURE 3 shows that the angular length of arc 002 increases in the order from the filaments of group I to the filaments of group III, the opening angles $x$, $y$, $z$, $z'$ and $z''$ (not represented) corresponding roughly to the angle $2\alpha$.

The differences in opening angles $x$, $y$, $z$, $z'$ and $z''$ are more clearly shown when the angle $2\alpha$ is measured from the photometric curve of intensity of arc 022, $\alpha$ being the angular length in degrees of the interference arc at half-maximum intensity, as previously described. The range of opening angles for the filaments of Groups I, II and III are illustrated in the following table.

TABLE I.—REGENERATED CELLULOSE

| Alkali resistant filaments: | Orientation angle, degrees |
|---|---|
| Group I (incorporating filament A) | 20–25 |
| Group II (incorporating filament C) | 28–34 |
| Group III (incorporating filaments D, E, F) | 35–47 |

The results illustrated above clearly indicate that the new filaments of group III have a higher orientation angle than the filaments of groups I and II, and therefore the mean inclination of the fibrils in relation to the axis of the filaments is higher for the filaments of group III. This is clearly evident in FIGURES 2(A), (B), (C), (C'), (C'') and (D) which show the structure, and, in particular, the inclination of the fibrils in the filaments of groups I, II, III and cotton.

The novel alkali resistant filaments produced in accordance with the present invention in addition to having an orientation angle above 35°, also have an organization degree of about 0.42 to about 0.48.

The organization degree is in direct relationship with the sum of the crystalline parts which constitute the filaments and it is related to what is also called the degree of order. There are various methods known to workers in the art for measuring the organization degree of textile materials. The determination of the organization degree of the filaments of groups I, II and III was carried out in accordance with the method of C. Legrand, set forth in Bulletin de l'Institut Textile de France, No. 125, July-August, 1966, pages 519 to 530.

In this method divergent X-rays produced by an X-ray tube fall on to a sample of about 350 mg. of compressed fibers (at room hygrometry and temperature) cut to a length of about 30 microns and disposed at a thickness of 2 mm. on a rectangular surface of 24 x 13 mm., on a rotating plane in the center of a goniometer.

The focalization is produced on a slit of the goniometric circle behind which is disposed a metering head, both the slit and the metering head moving along the goniometric circle at an angular speed which is twice that of the rotating plane which supports the sample of cut fibers.

The organization degree is calculated only in the region of maximum intensity of the curves obtained, that is, at the angle $2\alpha$ of 14–26° corresponding to the crystalline zones $10\bar{1}$ and 002. These curves are represented in FIGURE 4. An approximate measure of the organization degree was obtained from the ratio $$\frac{C}{C+D}$$

C being the surface corresponding to the crystalline zones and D the surface corresponding to the amorphous zone.

The novel alkali resistant filaments produced in accordance with the present invention are compared below in Table II with the filaments of the prior art.

TABLE II.—REGENERATED CELLULOSE

Alkali resistant filaments: Organization degree
   Group I (incorporating filament A) ____ 0.42–0.47
   Group II (incorporating filament C) ___ 0.40–0.42
   Group III (incorporating filaments D, E, F) _____ 0.42–0.48

These results show that filaments D, E, and F have an organization degree which is higher than that of filament C and about equal to that of filament A. These results further indicate that filaments D, E, F in spite of their low orientation (and higher orientation angle), still possess a high organization degree which is comparable to that of filament A. These results appear more clearly from Table III, which combines measures both of orientation angle and organization degree, set forth in Table I and Table II.

TABLE III

|  | Orientation Angle (deg.) | Organization Degree |
|---|---|---|
| Group I (Incorporating filament A) | 20–25 | 0.42–0.47 |
| Group II (Incorporating filament C) | 28–34 | 0.40–0.42 |
| Group III (Incorporating filaments D, E, F) | 35–47 | 0.42–0.48 |

The alkali resistant filaments manufactured prior to the present invention possessed either a high organization degree with a sacrifice of orientation angle, as noted from Filament A of Group I, or a higher orientation angle with a sacrifice of organization degree as noted from Filament C of Group II. Thus, prior to the present invention, i.e., the development of Filaments D, E and F it was impossible to combine both properties at their highest values at the same time in the same filament. In fact, all the important properties of cellulose regenerated filaments, for example, tenacity, elongation modulus, work to rupture, fibrillation resistance, loop strength, resistance to strong alkalis, dye affinity, etc., depend either from the organization degree or from the orientation angle or from both at the same time. The well defined fibrils of a high degree of organization, which are also strongly inclined in relation to the axis of the higher mechanical and technological properties of the new alkali resistant filaments of the present invention.

FIGS. 5a and 5b tenacity-elongation curves illustrating the advantages of the alkali resistant filaments produced in accordance with present invention over those produced in the prior art. FIG. 5a specifically illustrates conditioned elongation curves. FIG. 5b specifically illustrates wet elongation curves.

The alkali resistant filaments of this invention, which have a conditioned tenacity of at least about 3.5 g./den., and at the same time, a conditioned elongation of at least 14% are compared below in Table IV with the filaments of the prior art.

TABLE IV

| Alkali resistant filaments | Conditioned Tenacity, g./den. | Conditioned Elongation, percent |
|---|---|---|
| Group I: Filaments with a very high tenacity and a very low elongation | 4–10 | 8–4 |
| Group II: Filaments with lower tenactly and higher elongation | 3.5–5.5 | 13–11 |
| Group III: Filaments of the present invention | 3.5–7 | 30–14 |

Table IV shows that the filaments of the present invention can be produced in different ranges of tenacity and elongation. Conditioned tenacity may rise from 3.5 to 7 g./den. while the corresponding conditioned elongation decreases from 30 to 14%. This combined level of conditioned tenacity and conditioned elongation for the filaments of the invention (Group III) is much higher, as will be shown later, than that of filaments of Groups I and II.

With respect to the high wet tenacity and wet elongation of the alkali resistant filaments produced in accordance with the present invention, reference is made to Table V below, wherein the filaments of the present invenion are compared with the prior art filaments.

TABLE V

| Alkali resistant filaments | Wet Tenacity, g./den. | Wet Elongation, percent |
|---|---|---|
| Group I: Filaments with a very high tenacity and a very low elongation | 3–8.6 | 9.6–5 |
| Group II: Filaments with lower tenacity and higher elongation | 2.2–4.7 | 16–7 |
| Group III: Filaments of the present invention | 2.7–6 | 40–16 |

Table V shows equally that the wet tenacity of the alkali resistant filaments of the present invention may rise from 2.7 to 6 g./den. while the corresponding wet elongation decreases from 40 to 16%. This combined level of wet tenacity and wet elongation for the filaments of the present invention (Group III) is much higher, as will be shown later, than that of filaments of Groups I and II.

The "work to rupture" value of textile filaments is an extremely important parameter from an industrial standpoint and it is much more representative than the individual factors of tenacity or elongation to rupture, that is the "work to rupture" value represents the work that can be done by the filament, the stresses that it can withstand during its passage through textile machinery, the resistance the filament has to fatigue and wear.

The work to rupture value of textile filaments is a function of the area covered by their load-elongation diagram. As the tenacity-elongation curves have the form of a very flattened letter S, or the form of a flattened arc, the areas in question can, in general, be equated to right triangles and therefore the area is roughly half the product of tenacity multiplied by elongation. Therefore, tenacity multiplied by elongation is proportionally an approximate measure of work to rupture. When the wet, respectively the conditioned tenacity in g./den. is multiplied by the wet, respectively the conditioned elongation percent of the filaments of the present invention, there is obtained a figure which is called the "work product" which extends from about 70 to about 115 in ranges of conditioned tenacity of about 3.5–7 g./den. and ranges of conditioned elongation of about 30–14% which are especially valuable for commercial textiles uses.

In Table VI below, the work product values in the conditioned and the wet states are compared for filament A of Group I, filament B of Group II (Normal), filament C of Group II (improved) and novel alkali resistant filaments D, E and F of Group III (present invention).

TABLE VI

|  | Conditioned State Work Product | Wet State Work Product |
| --- | --- | --- |
| Group I: |  |  |
| In general | 30–90 | 20–77 |
| Filament A | 42 | 39 |
| Group II: |  |  |
| In general | 45–75 | 30–70 |
| Filament B (Group II normal) | 45.5 | 39 |
| Filament C (Group II improved) | 67 | 58 |
| Group III (filaments of the present invention): |  |  |
| In general | 70–115 | 70–115 |
| Filament D | 102 | 90.5 |
| Filament E | 91 | 92 |
| Filament F | 114 | 112 |

It is clearly seen from FIGURES 5a and 5b that the areas limited by the curves, by the $x$ axis and by the perpendiculars from the ends of the curves to the $x$ axis, are much greater for Filaments D, E and F of the present invention, when compared with Filaments A, B and C of the prior art.

Table VI shows also that the filaments of the present invention have a work product that is very high as compared to other prior art alkali-resistant filaments, both in the conditioned and wet states.

In addition, it should be emphasized that the filaments of the present invention, even in the already known ranges or work product, have tenacities and elongation characteristics in an entirely new and much more advantageous area, unknown for the filaments of the prior art.

FIG. 6 illustrates the wet elongation under a load of 0.5 g./den. of a filaments D, G and F of the invention (Group III) after treatment with a 5% caustic soda solution at 20° C. for 15 minutes. This wet elongation is conventionally considered as a "modulus of elasticity."

FIG. 6 illustrates equally the wet elongation under a load of 0.5 g./den. for filament A of Group I, filament C of Group II and on the other hand for a rayon tire filament, and for a so-called high wet modulus (HWM) filament after treatment of these filaments with a 5% caustic soda solution at 20° C. for 15 minutes.

FIG. 6 shows a wet modulus of elasticity (after treatment with a 5% NaOH solution) of 7 for filament F, 5.5 for filament G and 3.2 for filament D, all of Group III, and a wet modulus of elasticity of 2.5 for a filament of Group I and 5 for a filament of Group II normal.

It is clear, consequently, that all alkali resistant filaments of Groups I, II and III have a relatively high modulus of elasticity always lower than 8 while the rayon tire filament has a modulus of 20 and the so-called HWM filament a modulus of about 15, that is a very low modulus of elasticity. The corresponding modulus of an ordinary rayon filament is even higher than 20.

Another outstanding characteristic of the alkali resistant filaments produced in accordance with the present invention is the loop tenacity which in the conditioned state is above 1.2 g./den. and generally about 1.2–2.1 g./den.

Further, the fact that the alkali resistant filaments of the invention have simultaneously in the conditioned state a loop tenacity of 1.2–2.1 g./den. and an elongation of 14.30%, is one of the most distinguishing properties of the filaments of the present invention.

The loop tenacity in g./den. in the conditioned state for filaments of Groups I, II and III is illustrated below:

TABLE VII

Alkali resistant filaments: Loop tenacity
  Group—I (Filament A) _____ 0.8
    II (Filament C) _____ 0.9–1.1
    III:
      (Filament D) _____ 1.4
      (Filament E) _____ 1.7
      (Filament F) _____ 2.1

It is highly unexpected therefore that the alkali resistant filaments of this invention could possess an excellent loop tenacity and good elongation and at the same time have a high organization degree.

It is indicated at this point that the loop tenacities indicated in this application are calculated from the ratio:

$$\frac{\text{tenacity at rupture of the loop (g./den.)}}{2 \times \text{titer (den.)}}$$

and not, as this appears sometimes in the literature from the ratio:

$$\frac{\text{tenacity at rupture of the loop (g./den.)}}{\text{Titer (den.)}}$$

The tendency to fibrillation was examined by subjecting a mixture of 2 grams of product and 200 cc. water to vigorous beating in a "Knapp Monarch" mixer furnished with a rotary blade turning at the rate of 12,000 r.p.m. The 18 minute treatment in the mixer causes some beginning of fibrillation on the filament D of the present invention, as shown in FIGURE 7C and no fibrillation on filaments E and F as shown in FIGURES 7D and E whereas known alkali resistant filaments show numerous fibrils as clearly shown in FIGURES 7A and 7B. If the time of treatment is doubled, that is, from 18 to 36 minutes, it is observed from FIGURE 7C' that part of the filament D of this invention presents some longer fibrils and from FIGURES 7D' and 7E' that filaments E and F are practically not fibrillated, while on the alkali resistant filaments of the prior art, fibrillation is very pronounced, as clearly shown in FIGURES 7A' and 7B'.

The fibrillation resistance may be evaluated more specifically by determining the "water filtration number" of alkali resistant filaments which have been submitted to vigorous beating, in accordance with the method which is described by Battista, Howsmon and Coppick in Industrial and Engineering Chemistry, Volume 45, page 2107, September 1953.

In carrying out this method a dispersion of 4 grams of the beaten filaments in 180 cu. cm. of water is filtrated under a vacuum upon a fritted glass filter having a diameter of 32 mm. A cake of beaten filaments forms on the surface of the glass filter and an additional quantity of 100 cu. cm. of water is poured over the cake of beaten filaments and filtered under a vacuum. The water filtration number is the time in seconds which is required for the 100 cu. cm. of water to filtrate completely through the cake of beaten filaments. Therefore, the water filtrates all the more slowly when the filaments are more fibrillated. The water filtration numbers which were obtained from the filaments of Groups I, II and III are reproduced in Table VIII below:

TABLE VIII

Alkali resistant filaments: Water filtration number

Group—I (Filament A) _____ 70
      II (Filament C) _____ 20
      III (Filament D) _____ 8–10
          (Filament E) _____ 5–6
          (Filament F) _____ <4

The alkali resistant regenerated cellulose filaments produced in accordance with this invention, in addition to having an orientation angle above 35° and an organization degree of 0.42 to 0.48, also possess a dyeing index of about 1.15.

Conventionally the dyeing index is the weight ratio of dye which is fixed on filaments immersed for a period of about 30 minutes in a bath containing "Chlorantine Light Green 5 BLL," (C.I. Direct Green 27), in given conditions which are listed below:

Filaments/Bath Ratio _____ 1/75 (Weight ratio between the filaments and the bath).
Concentration of Dye _____ 1.5% in relation to the weight of the filaments.
Concentration of Electrolyte
  $SO_4Na_2$ _____ 50% in relation to the weight of the filaments.
Temperature _____ 80° C.

The dyeing index is expressed by the weight ratio:

$$\frac{\text{Dye picked up by the filaments}}{\text{Dye present initially in the bath}}$$

(Expressed in a percentage)

The following table gives the percentage of the dye which is picked up by filaments of Groups I, II and III at different time intervals within five hours.

TABLE IX

| Dyeing Time | Percent of Dye fixed on the filaments | | |
|---|---|---|---|
| | Group I | Group II | Group III (Filament D, E, and F) |
| 5 minutes | 0.21 | 0.8 | 0.9–1 |
| 15 minutes | 0.36 | 1 | 1.1–1.2 |
| 30 minutes (dyeing index) | 0.50 | 1.10 | 1.15 |
| 1 hour | 0.80 | 1.18 | 1.25–1.30 |
| 2 hours | 1.05 | 1.30 | 1.30 |
| 5 hours | 1.3 | 1.38 | 1.35 |

Table IX illustrates that the dyeing index of filaments of Group III is much higher than the dyeing index of filaments of Group I while it is nearly equal to that of filaments of Group II. For higher dyeing times, as is well known, the differences become smaller and finally after about 5 hours they disappear almost completely. Inversely, after 5 minutes of dyeing time, which is a very short period, the differences are more pronounced. However, after about 30 minutes, which approaches dyeing time on an industrial scale, the filaments of Group III show a specifically higher dyeing index than that displayed by the filaments of Group I. Even though the filaments of Group II display a dyeing index after 30 minutes of 1.10 these filaments have a lower orientation angle, a lower organization degree, and consequently inferior mechanical properties, in comparison with filaments of Group III.

The novel alkali resistant filaments of the present invention can be made into fabrics which have an excellent ability to take wash and wear treatments. No. 70 metric yarns with a torsion of 830 turns per meter were prepared from 1.5 denier filaments of Groups I, II and III (Filament D) cut to a length of 40 mm. and from cotton. The mechanical properties of the spun yarns which were obtained are listed below in Table X.

TABLE X.—PROPERTIES OF NO. 70 METRIC YARNS

| | Group I | Group II, Improved | Group III, (Present Invention) Filament D | Cotton Yarn |
|---|---|---|---|---|
| RKm [1] conditioned | 18.9 | 19.1 | 27.5 | 14.1 |
| RKm wet | 14.6 | 14.8 | 22.3 | 17.9 |
| Elongation conditioned | 7.7 | 8 | 9.9 | 6.8 |
| Elongation wet | 7.8 | 9 | 12.5 | 7.7 |
| Lea-Test | 2,900 | 2,800 | 3,980 | 2,220 |

[1] Length of rupture in kilometers.

Poplin fabrics were woven from the spun yarns described above and the fabrics were then subjected to a permanent press treatment (Koratron type) whereupon the fabrics displayed the properties shown below in Table XI.

TABLE XI

| | Group I | Group II Improved | Group III (Present Invention) Filament D | Cotton |
|---|---|---|---|---|
| Weight per sq. meter, g | 112 | 113 | 112 | 111. |
| Count numbers per cm | 47 x 28 | 47 x 28 | 47 x 28 | 47 x 28. |
| Wash and Wear Index [1] | 3–4 | 3–4 | 3–4 | 3–4. |
| Conditioned strength, filling, Kg | 28 | 28 | 38 | 18. |
| Tear strength, filling, Kg | 1.1 | 1.3 | 1.9 | 0.4. |
| Stoll-flex Abrasion cycles | 130 | 110 | 275 | 180. |

[1] Monsanto Method, AATCC, 1965, No. 88A 1964.

The results obtained in Table XI, more specifically the conditioned strength, tear strength and abrasion, have been further emphasized by setting forth the results obtained from Table XI in FIG. 8. It is clearly evident from FIG. 8 that the fabric of the present invention prepared from the filament D of Group III displays an unexpected ability to withstand wash and wear treatments as compared to fabrics prepared from filaments of Groups I, II and cotton.

Furthermore, a No. 50 metric yarn with a torsion of 760 turns per meter was prepared from 3 den. filament F of Group III cut to a length of 40 mm.

The mechanical properties of the spun yarns which were obtained are listed below in Table XII.

TABLE XII

RKm conditioned _____ 16.1
RKm wet _____ 12.9
Elongation conditioned _____ 12.6

Elongation wet _____ 17.6
Lea test _____ 2.500

Table XII shows that the spun yarn from filament F has equally very valuable properties for the textile field, in particular where high elongation combined with relatively high tenacities are required.

Furthermore, No. 30 metric yarns were prepared from 2.2 den. acetylated filaments D′ (to be described later in Example 17) cut to a length of 40 mm.

The mechanical properties of the spun yarns which were obtained are enumerated below in Table XIII, in comparison with the properties of the corresponding spun yarn from triacetate filament described as well in Example 17.

TABLE XIII.—PROPERTIES OF NO. 30 METRIC YARN

|  | From Filament D′ | From Triacetate |
|---|---|---|
| RKm, conditioned | 15.1 | 6.4 |
| RKm, wet | 12.4 | 4.1 |
| Elongation, conditioned, percent | 9.4 | 13 |
| Elongation, wet percent | 11.7 | 21.3 |
| Lea Test | 2,438 | 928 |

Plain fabrics were woven from 30/2 ply yarns described above whereupon the fabrics displayed these properties shown in Table XIV.

TABLE XIV

|  | Present invention Acetylated Filament D′ | Triacetate Filament |
|---|---|---|
| Weight per sq. meter, g | 199 | 193 |
| Count numbers, per cm | 18 x 13 | 18 x 12 |
| Conditioned strength, filling, Kg | 85 | 31 |
| Conditioned elongation, filling percent | 14 | 17.8 |
| Wash and Wear index (Monsanto method, table XI) | 4–5 | 5 |
| Stoll-flex abrasion cycles until warp rupture (under standard weight) | 450–500 | 100 |

It is evident from Table XIV that the fabrics from the acetylated filaments of the present invention have far superior general properties when compared to corresponding fabrics from usual triacetate filaments.

The following are illustrative of the novel combination of steps for carrying out the process of the present invention for producing the novel alkali resistant filaments described herein above.

I. A viscose having a gamma index between 60 and 100, a viscosity greater than 300 poises and preferably greater than 500 poises, containing a cellulose whose DP is above 400.

II. A dilute acid bath having a temperature below 40° C., containing less than 25 g. per liter sulfuric acid, sodium sulfate, and small quantities of zinc sulfate, i.e., less than 2 g. per liter. At the time of spinning the bath should not decompose more than 40% of the xanthate groups which are initially present in the viscose.

III. A vertical or horizontal spinning device with or without tube can advantageously be used, for example, the device described in U.S. Patent No. 3,139,467, whereby vertically spun filaments which are too weak to support themselves, are supported from the time of emergence from the bath by a partially submerged roll on which they arrive tangentially.

IV. One of the essential characteristics of the process for preparing the novel alkali resistant filaments of this invention is the formation of a gel that simultaneously exhibits very exact physical and chemical characteristics (the term "gel" as used herein is to be understood to define freshly spun filaments in a state of partial regeneration). These characteristics are: gamma index, acidity, and swelling, and must be within a specific range. Furthermore, each of the said characteristics must have a specific value in its own range so that the claimed results may be obtained. In other words, there must be an interdependence between the said three parameters and any variation of one of the parameters in its own range immediately affects the other parameters. If these conditions are not observed, only medium quality alkali resistant filaments will be obtained with a work product, for example, which may be 30% lower. The gel is obtained by subjecting the freshly spun filaments upon their emergence from the first dilute bath and while they have a gamma index >45, to a friction stretching on fixed guides (first stretching operation), which causes a rapid elimination of the acid that impregnates the filaments. At this time, the filaments (designated simply by the expression "the gel") must have the following characteristics:

(a) The gel must contain a cellulose xanthate with a specific gamma index whose $\gamma_1$ value lies between 28 and 40, preferably between 32 and 36, that is (1) $$28 < \gamma_1 < 40$$

(the gamma index as is known represents the number of $CS_2$ molecules fixed on 100 glucose units).

(b) The gel must have a low degree of swelling (near to the limit degree of swelling) in order to have a homogeneous composition. It should have a degree of swelling G ranging between 5 and 8, preferably of the order of 6, that is (2) $$5 < G < 8$$

(the gel swelling represents, in fact, the ratio between the weight of centrifuged gel ($G=300$) and the weight of cellulose contained in said gel).

(c) The liquid impregnating the gel should have an acid concentration $a$ in grams/liter between 6 and 9.5, preferably between 7.5 and 8, that is (3) $$6 < a < 9.5$$

V. Another novel step of the process for preparing the novel alkali resistant filaments of this invention is the stretching of said obtained filaments in air. This second stretching operation is of the order of 0% to 100% and there is at this stage a decomposition of part of the residual xanthate groups under the effect of the acid contained in the liquid impregnating the gel.

Moreover, this second stretching operation is completely distinct and separate from the first stretching operation and makes it possible to produce alkali resistant filaments having mechanical properties varying in a wide range, extending for instance from 2.7 to 6 g./den. for tenacity in the wet state and from 40 to 16% for the corresponding elongation.

But all the alkali resistant filaments obtained, independently from the importance of the second stretching, have the same type of structure and keep a high work product. This emphasizes the wide reaching importance and unobvious nature of the new process of the invention.

VI. Still another important characteristic of the process of the present invention is the fact that the filaments in the gel state after the stretching in air, have a residual gamma index $\gamma_2$ between 18 and 28, preferably between 21 and 25 that is (4) $$18 < \gamma_2 < 28$$

It is important that the quantity of free acid contained in the gel be sufficient to cause complete decomposition of the cellulose xanthate at the moment of stretching.

A stoichiometric computation makes it possible to establish with sufficient precision that:

(5) $$\gamma_2 = \gamma_1 - \frac{a(G-1)}{3}$$

Since $\gamma_2$ must be between 18 and 28 according to Formula 4 above, there must be then:

(6) $$18 < \left[\gamma_1 - \frac{a(G-1)}{3}\right] < 28$$

Formula 6 expresses another essential condition of the invention. In other words, $\gamma_1$, G and $a$ must not only satisfy Formulae 1, 2 and 3, but also Formula 6.

Thus, if $\gamma_1=35$, $G=6$ and $a=7.5$, Formula 5 yields $\gamma_2=22.5$, which is well within the range of 18 to 28. The necessary conditions of the process will be obtained.

If, on the other hand, $\gamma_1=29$, $G=7$ and $a=8$, Formula 5 yields $\gamma_2=13$. This does not meet the conditions of the process because Formula 6 is not complied with.

It, therefore, is clearly evident that there must be a certain equilibrium between $\gamma_1$, $\gamma_2$, $a$ and $G$ if Formula 6 is to be verified. For example, when $\gamma_1$ is increased, $a$ or $G$ must be increased, or both $a$ and $G$, so that $\gamma_2$ will remain at the desired value.

VII. A further characteristic of the process for preparing the novel alkali resistant filaments of the present invention is the relaxation of the filaments in a bath which contains less than 2 grams per liter sulfuric acid.

This relaxation is effected in a dilute acid bath whose temperature is between 20 and 80° C. This relaxation further improves the excellent transverse characteristics of the initial gel filaments having determined gamma index, acidity, and swelling degree, and it gives rise to high loop strength and excellent fibrillation resistance of the filaments. This relaxation should be varied according to the physicomechanical properties desired of the filaments produced in accordance with this invention. The relaxation should be approximately 8 to 20%. After relaxation, the gamma index of the filaments will be between 14 and 6. Finally, regeneration of the filaments is accomplished in a third bath containing a dilute hot acid.

The invention will be further described by means of the following specific examples which are given for illustration only, and are not to be taken as in any way limiting the invention beyond the scope of the appended claims.

EXAMPLE 1

A sulfate pulp having a DP of 760 to 780 and containing 98% alpha cellulose was immersed in 240 g./liter caustic soda lye at 18° C. for 30 minutes, and the pressed to the ratio of 2.87 in proportion to alpha cellulose. The alkali cellulose thus formed was crumbed in a Warner shredder for 45 minutes, and then aged at 32° C. for 4 to 5 hours. This alkali cellulose was then xanthated with 55% carbon disulfide (in proportion to the alpha cellulose) in a churn at 22° C. for 5 hours and the resulting cellulose xanthate was then introduced into a mixer with water and a soda solution to be converted into a viscose containing 5.5% cellulose of DP=600 and 3.4% soda, with a viscosity between 550 and 600 poises, and a gamma index of 76 in final solution. This viscose additionally contained 25 p.p.m. of gluconic acid (a complexing agent) and 0.1% liter of an antifoaming agent such as isodecanol.

This viscose was spun in a first bath containing 15 g./liter sulfuric acid, 52 g./liter sodium sulfate, 0.3 g./liter zinc sulfate and 0.03 g./liter of an anionic agent (sodium alkylarylsulfonate, imparting a surface tension of 32 dynes/cm.[2] to the bath) at a temperature of 25° C., using a spinneret with 6,600 orifices $7/100$ mm. in diameter The filaments were spun vertically without a tube, passed through the bath over a path 20 cm. in length, and, at the point of emergence, while they were still incapable of supporting themselves, they were taken up tangentially by a roll semi-submerged in the bath, which carried the filaments slowly out of the bath. When they had traveled a certain distance on the external part of the roll, coagulation had progressed sufficiently and the filaments then had sufficient strength to sustain themselves in the air and to be able to be subjected to the first stretching operation. The vertical spinning device used was substantially the same as that described in U.S. Patent 3,139,467. The gamma index of the filaments as they emerged from the bath was of the order of 50.

The filaments then passed on fixed guides through a series of sharp angles and along a louvered path while they were subjected to a 60% first stretching which had the effect of squeezing off the adhering acid liquid, thereby totally removing the entrained bath liquid. The liquid subsequently expressed from the filaments was thus derived practically from the interior of the filaments. At the level of the last guide element, the liquid had an acid content of 7.5 g./liter. At the same level, the filaments in the gel state had a gamma index of 34 and a gel swelling of 6.

The filaments without adhering liquid, i.e., expressed gel filaments, were then subjected in air, and without the action of any outside liquid, to a second 80% stretching operation which brought the total stretch to 188%. At the end of the stretching operation, because of the acidity and the gel swelling previously described, the residual gamma index still was 22, so that the conditions of Formulae 1, 2, 3 and 6 were fulfilled. The filaments were then relaxed between two sets of rollers in a 20° C. bath containing 0.5 g./liter sulfuric acid, so that during this operation they retracted by 12%. Upon emergence from the relaxation bath, the gamma index was 12. Finally, regeneration was accompished in a 95° C. bath containing 10 g. sulfuric acid and 20 g. sodium sulfate per liter. The speed of the filaments at the end of the spinning machine was 20 m./min.

After the usual finishing treatments, the filaments which were obtained presented the characteristics indicated in Table XV below.

In comparison, there are indicated in Table XV the characteristics of a filament of Group I (high tenacity and very low elongation—Filament A), of a filament of Group II Normal (low tenacity and high elongation—Filament B), of a filament of Group II Improved (Filament C) and of a filament of the present invention obtained in accordance with Example I (Filament D—Group III).

TABLE XV

| | Group I, Filament A | Group II, Normal, Filament B | Group II, Improved, Filament C | Group III, Filament of the present invention, Filament D |
|---|---|---|---|---|
| Titer, den | 1.5 | 1.5 | 1.5 | 1.5 |
| Tenacity, g.p.d. (conditioned) | 7.0 | 3.5 | 5.3 | 6.2 |
| Elongation, percent (conditioned) | 6.0 | 13.0 | 12.8 | 16.6 |
| Wet tenacity, g.p.d | 6.0 | 2.6 | 4.2 | 5.0 |
| Wet elongation, percent | 6.5 | 15.0 | 13.9 | 18.2 |
| Work Product: (tenacity×elongation): | | | | |
| Conditioned | 42.0 | 45.5 | 67.0 | 102.0 |
| Wet | 39.0 | 39.0 | 64.0 | 90.0 |
| Loop Tenacity, g.p.d. Conditioned | 0.83 | 0.7 | 0.9 | 1.4 |
| Wet Modulus (elongation percent under a load of 0.5 g.p.d.) | 1.0 | 2.8 | 2.4 | 2.2 |
| Wet Modulus after action of 5% NaOH (elongation percent under a load of 0.5 g./den.) | 1.6 | 4 | 3.7 | 3.1 |
| Orientation angle | 22 | 30 | 32 | 42 |
| Organization degree | 0.47 | 0.40 | 0.42 | 0.48 |
| Water filtration number | 70 | 20 | 20 | 10 |
| Dyeing index | 0.5 | 1.2 | 1.1 | 1.15 |

Table XV clearly shows the important characteristics of the filaments of the present invention from the point of view of the work product, as well as from the point of view of tenacity, elongation, modulus of elasticity, loop tenacity, and resistance to 5% soda solutions.

All characteristics of tenacity and elongation at break given in Table XV and throughout this disclosure were determined according to the well known rules of B.I.S.F.A. (Bureau International pour la Standardisation des Fibres Artificielles).

Moreover, it is already apparent from Table X that the novel alkali resistant filaments of the present invention make is possible to obtain yarns that not only in the conditioned state, but also in the wet state, have characteristics of tenacity and elongation which are superior to those of corresponding combed American cotton yarns.

The excellent general properties of the filaments of the invention are also evident at all stages subsequent to spinning, especially in sizing, weaving, bleaching, finishing, etc.

The ability of these fibers to take "wash and wear" treatments of the "Koratron" type, for example, is excellent. After this treatment breaking load and abrasion resistance are considerably higher for fabrics made from the described filaments in comparison to fabrics made from filaments of Group I, Group II and cotton as more fully illustrated in FIG. 8. These results show that filament D is particularly suitable for blending with cotton.

EXAMPLE 2

Exactly the same viscose was used as described in Example 1, and spinning was carried out in a bath containing 17.5 g./liter sulfuric acid, 50 g./liter sodium sulfate, 0.3 g./liter zinc sulfate, and 0.03 g./liter of an anionic agent, i.e., sodium alkylarysulfonate (which imparted a surface tension of 32 dynes/sq. cm. to the bath) at a temperature of 24° C., using a spinneret with 6,600 orifices 7/100 mm. in diameter. The filaments were spun vertically without a tube, passed through the bath over a path 20 cm. in length, and at the point of emergence, they were taken up tangentially by a semi-submerged roll that carried the filaments out of the bath, as in Example 1. After having traveled a certain distance on the outer part of the roll, the filaments were subjected to a first 45% stretching but they did not pass on fixed guides along a louvered path as in Example 1. In these conditions, the first stretching brought about a much lower decrease of liquid content in comparison to that of Example 1, and because of this, the liquid extracted from the filaments and collected immediately after the first stretching had an acid content of 10 g./liter. At this level, the filaments had a gamma index of 30 and a gel swelling of 7.

The slightly expressed gel filaments were then subjected to a supplementary stretch of 70%, in air, without undergoing the action of any external liquid, which brought the total stretching up to 146%. At the end of the stretching, the filaments had a residual gamma index of 10. The filaments were then relaxed with no tension in a 20° C. bath that contained 0.5 g./liter sulfuric acid. During this operation, the filaments underwent a maximum retraction of 6%; upon emerging from the relaxation bath, the gamma index was 3. The filaments were finally passed into a regenerating bath which had the same composition and temperature as in Example 1. The speed of the filaments bundle at the end of the spinning machine was 20 meters per minute.

After the usual finishing treatments, a filament bundle was obtained which had the following characteristics:

Total denier _____ 9900
Filament denier _____ 1.5
Tenacity (condtioned), g.p.d. _____ 5
Elongation (conditioned) percent _____ 11
Tenacity (wet), g.p.d. _____ 4
Elongation (wet) percent _____ 12.5
Loop tenacity, g./den. (conditioned) _____ 0.9
Work product:
  Conditioned _____ 55
  Wet _____ 50
Orientation angle _____ 28
Organization degree _____ 0.47
Water filtration number _____ 35
Dyeing index _____ 0.6

The relatively poor qualities of the filaments obtained in Example 2 are clearly due to the fact that the values of $a$, and $\gamma_2$ did not satisfy the limit requirements of Formulae 3, 4 and 6.

EXAMPLES 3 TO 8

The viscose of Example I was spun in the same bath and under the same conditions as described in Example I, with the exception that the first stretching and more particularly the second stretching operation was varied.

The filaments were spun vertically without a tube, passed through the bath over a path 20 cm. in length, and, at the point of emergence, while they were still incapable of supporting themselves, they were taken up tangentially by a roll semi-submerged in the bath, which carried the filaments slowly out of the bath. When they had traveled a certain distance on the external part of the roll, coagulation had progressed sufficiently, and the filaments then had sufficient strength to sustain themselves in the air and to be able to be subjected to the first stretching operation. The vertical spinning device used was substantially the same as that described in U.S. Patent 3,139,467. The gamma index of the filaments as they emerged from the bath was of the order of 50.

The filaments then passed on fixed guides through a series of sharp angles and along a louvered path while they were subjected respectively to a 45, 50, 60, 60, 65, 45% first stretching operation which had the effect of squeezing off the adhering acid liquid, thereby totally removing the entrained bath liquid. The liquid subsequently expressed from the filaments was thus derived practically from the interior of the filaments. At the level of the last guide element, the liquid had an acid content of 7–7.5 g./liter. At the same level, the filaments in the gel state had a gamma index of 33–35 and a gel swelling of 6–6.5.

The filaments without adhering liquid, i.e. expressed gel filaments, were then subjected in air, and without the action of any outside liquid, respectively to a second 0, 7, 11.2, 38, 60, and 90% stretching operation, so that the total stretch was respectively 45, 60, 80, 120, 165 and 175%. At the end of this second stretching operation the gamma index $\gamma_2$ of the filaments was comprised between 18 and 22.

After this second stretching operation the filaments were relaxed from 11 to 12% in a 20° C. bath containing 0.5 g./liter sulfuric acid and then regeneration was accomplished in a 95° C. bath containing 10 g. sulfuric acid and 20 g. sodium sulfate per liter.

The final speed of the filaments at the end of the spinning machine was respectively of 10, 11.1, 12.5 15.2, 18.4 and 19 meters per minute.

After the usual finishing treatments, the filaments which were obtained presented the characteristics indicated in Table XVI including the characteristics of filament D, for comparison purposes.

TABLE XVI.—GROUP III, FILAMENTS OF THE PRESENT INVENTION

| Example | 4 | 5 | 3 | 6 | 7 | 1 | 8 |
|---|---|---|---|---|---|---|---|
| Filament Reference | F | G | H | E | I | D | J |
| First Stretching | 45 | 50 | 60 | 60 | 65 | 60 | 45 |
| Second Stretching | 0 | 7 | 11.2 | 38 | 60 | 80 | 90 |
| Total Stretching | 45 | 60 | 80 | 120 | 165 | 188 | 175 |
| Titer, den | 3 | 2.7 | 2.4 | 2 | 1.6 | 1.5 | 1.5 |
| Tenacity g./den. (Conditioned) | 3.8 | 4.2 | 4.7 | 5.1 | 5.8 | 6.2 | 6.5 |
| Elongation percent (Conditioned) | 30 | 26 | 21 | 18 | 17.5 | 16.6 | 14.5 |
| Wet tenacity, g./den | 2.8 | 3.2 | 3.6 | 4.2 | 4.6 | 5 | 5.5 |
| Wet elongation, percent | 40 | 33 | 27 | 22 | 19 | 18.2 | 16 |
| Work Product (tenacity×elongation): | | | | | | | |
|   Conditioned | 114 | 109 | 98 | 91 | 101 | 102 | 94 |
|   Wet | 112 | 105 | 97 | 92 | 87 | 90 | 88 |
|   Loop tenacity, g./den. (conditioned) | 2.1 | 1.8 | 1.7 | 1.7 | 1.6 | 1.4 | 1.2 |
|   Wet Modulus (elongation percent under a load of 0.5 g./den.) | 4.5 | 3.7 | 3.2 | 2.8 | 2.4 | 2.2 | 1.8 |
|   Wet Modulus after action of 5% NaOH (elongation percent under a load of 0.5 g./den.) | 7 | 5.5 | 4.7 | 3.9 | 3.4 | 3.1 | 2.9 |
| Orientation angle | 47 | | 45 | 43 | | 42 | 37 |
| Organization degree | 0.42 | | 0.43 | 0.46 | | 0.48 | 0.48 |
| Water filtration number | 3 | 4 | 4 | 6 | 10 | 10 | 10 |
| Dyeing index | 1.2 | 1.15 | 1.15 | 1.1 | 1.15 | 1.1 | 1.1 |

Table XVI clearly shows the wide range of properties, in particular of elongation and loop tenacity of the alkali resistant filaments of the present invention, which nevertheless have all a high work product, a relatively high wet modulus and an excellent resistance to fibrillation.

It is equally apparent from Table XVI that the fibers from filaments D, E, F, G, H, I, and J of the present invention are highly suitable for blends either with a variety of synthetic fibers or wool, or cotton, since they have tenacity and elongation properties which spread over a very large area, the loop tenacity remaining always at a high level.

EXAMPLES 9 TO 12

A sulfate pulp having a DP of 760 to 780 and containing 98% alpha cellulose was immersed in 240 g./liter caustic soda lye at 18° C. for 30 minutes, and then pressed to the ratio of 2.87 in proportion to alpha cellulose. The alkali cellulose thus formed was crumbed in a Werner shredder for 45 minutes, and then aged at 32° C. for 4 to 5 hours. This alkali cellulose was then xanthated with 55% carbon disulfide (in proportion to the alpha cellulose) in a churn at 22° C. for 5 hours and then introduced into a mixer with water and a soda solution to be converted into a viscose containing 6.2% cellulose of DP=600 and 3.5% caustic soda, with a viscosity of 900 poises, and a gamma index of 77 in final solution. This viscose additionally contained 25 p.p.m. of gluconic acid (a complexing agent) and 0.1% of an anti-foaming agent such as isodecanol.

This viscose was spun in a first bath containing 15.8 g./liter sulfuric acid, 53 g./liter sodium sulfate, 0.3 g./liter zinc sulfate and 0.03 liter of an anionic agent (sodium alkylarysulfonate, imparting a surface tension of 32 dynes/cm.$^2$ to the bath) at a temperature of 25° C., using the same technological arrangement as in Example 1, except that the filaments passed through the bath over a path 22 cm. in length.

The filaments then passed on fixed guides through a series of sharp angles and along a louvered path while they were subjected respectively to a 54, 60, 60, 65% first stretching operation which had the effect of squeezing off the adhering acid liquid, thereby totally removing the entrained bath liquid. At the level of the last guide element, the liquid had an acid content of 7-7.8 g./liter. At the same level, the filaments in the gel state had a gamma index of 32-35 and a gel swelling of 6-6.5.

The filaments without adhering liquid, i.e. expressed gel filaments, were ten subjected in air, and without the action of any outside liquid respectively to a second 0, 11.2, 38 and 60% second stretching operation which brought the total stretch respectively to 54, 80, 120 and 165%. At the end of this second stretching operation, the gamma index $\gamma_2$ was comprised between 19 and 23. The filaments were then relaxed in an amount of 11 to 12.5 in the same bath as in Example 1, and then regenerated equally in the same conditions as in Example 1. At the point of collection the filaments had respectively a speed of 15, 17.5 21 and 26 meters per minute.

After the usual finishing treatments, the filaments which were obtained presented the characteristics indicated in Table XVII below.

TABLE XVII.—GROUP III: FILAMENTS OF THE PRESENT INVENTION

| Example | 9 | 10 | 11 | 12 |
|---|---|---|---|---|
| Filament Reference | K | L | R | S |
| First Stretching | 54 | 60 | 60 | 65 |
| Second Stretching | 0 | 11.2 | 38 | 60 |
| Total Stretching | 54 | 80 | 120 | 165 |
| Titer, den | 2.8 | 2.4 | 2 | 1.6 |
| Tenacity g./den. (conditioned) | 3.6 | 4 | 4.6 | 5.4 |
| Elongation percent conditioned | 21 | 18 | 16 | 14.2 |
| Wet tenacity, g./den | 2.7 | 2.9 | 3.5 | 4.3 |
| Wet elongation, percent | 30 | 25 | 22 | 16 |
| Work Product (tenacity×elongation): | | | | |
|   Conditioned | 75 | 72 | 73 | 76 |
|   Wet | 81 | 72 | 77 | 69 |
|   Loop tenacity, g./den. (conditioned) | 1.7 | 1.5 | 1.4 | 1.3 |
|   Wet Modulus (elongation percent under a load of 0.5 g./den( | 3.6 | 3.1 | 2.7 | 1.9 |
|   Wet Modulus after action of 5% NaOH (elongation percent under a load of 0.5 g./den.) | 5.5 | 4.5 | 3.8 | 3 |
| Orientation angle | | 43 | | 42 |
| Organization degree | 0.43 | | 0.47 | |
| Water filtration number | 5 | 7 | 8 | 9 |
| Dyeing index | 1.1 | 1.1 | 1.1 | 1.11 |

The filaments K, L, R and S of Table XVII show general characteristics somewhat lower than those of the filaments of Table XVI in particular because of the higher spinning speed in Examples 9 to 12.

EXAMPLE 13

Exactly the same viscose was utilized as in Example 1 and spinning was carried out in a bath containing 14 g./liter sulfuric acid, 50 g./liter sodium sulfate, 0.3 g./liter zinc sulfate and 0.03 g./liter of an anionic agent, sodium alkylarysulfonate (which imparted to the bath a surface tension of 32 dynes/cm.$^2$) at a temperature of 25° C., using a 200 orifice spinneret, said orifices being 8/100 mm. in diameter. The filaments traveled horizontally for 250 mm. in the bath, and then were withdrawn from the bath, passed over a roll, and then on fixed guides over a louvered path, while they were simultaneously subjected to a stretch of 60%. The passage on the guides in a series of sharp angles and the first stretching had the effect of decreasing the liquid content of the filaments and removing from them a large amount of the impregnating bath liquid. The liquid extracted from the filaments and collected on the last downstream guide had an acid content of 8 g./liter. At the level of the said final guide, the filaments had a gamma index of 33 and a gel swelling of 7.

The expressed gel filaments were then subjected to a supplementary 80% stretch in air, and without undergoing the action of any outside liquid, said process bringing the total stretching to 188%. At the end of the stretching, the filaments had the residual gamma index of 17. It will thus be appreciated that in Example 13, the $\gamma_2$ value was at the limit of its range. The filaments were then relaxed in a 20° C. bath that contained 0.5 g./liter sulfuric acid. During this operation, the filaments retracted by 9% and upon emerging from the relaxation bath, the filaments presented a gamma index of 10. The filaments were finally passed into a regenerating bath which had the same composition and temperature as that of Example 1, and the yarn was collected on a bobbin. The speed at the end of the spinning machine was 30 meters per minute.

After the usual finishing treatments, a filament bundle was obtained which had the following characteristics:

| | |
|---|---|
| Filament reference | T |
| Total denier | 300 |
| Filament denier | 1.5 |
| Tenacity (g.p.d.) conditioned | 6 |
| Elongation (conditioned), percent | 15 |
| Tenacity (wet), g.p.d. | 4.8 |
| Elongation (wet), percent | 17 |
| Loop tenacity g./den. (conditioned) | 1.3 |
| Work product: | |
| Conditioned | 90 |
| Wet | 81 |
| Orientation angle | 41 |
| Degree of organization | 0.48 |
| Water filtration number | 9 |
| Dyeing index | 1.1 |

EXAMPLE 14

A viscose exactly like that described in Example 1 was spun in a bath containing 13 g./liter sulfuric acid, 50 g./liter sodium sulfate, and 0.03 g./liter of an anionic agent, sodium alkylarysulfonate (which imparted a surface tension of 32 dynes/cm.$^2$) at a temperature of 25° C., using a spinneret with 1,100 orifices $7/100$ mm. in diameter. The filaments were spun vertically without a tube, and after traveling 350 mm. they were taken up tangentially at their point of emergence by a semi-submerged roll that carried them slowly out of the bath. When the filaments had traveled along a certain arch of the roll, coagulation had progressed sufficiently so that the filaments had sufficient strength to support themselves in the air and to undergo stretching operations; the vertical spinning device utilized was substantially identical with that already described in U.S. Patent 3,139,467. The gamma index of the filaments upon emerging from the bath, was on the order of 50.

The filaments passed then over fixed guides in a series of sharp angles, as in Example 1, while simultaneously being subjected to a 64% preliminary stretch. The liquid collected on the last guide had an acid content of 7 g./liter. At this level, the filaments had a gamma index of 36 and a gel swelling of 7.

The expressed gel filaments were then subjected to an 84% stretch in air without the action of any external liquid, bringing the total stretching to 201%. At the end of the stretching, the filaments had a residual gamma index of 22. They then passed through a relaxation bath constituted by an 0.5% sulfuric acid solution of 20° C., where they contracted by 11%. Finally, the filaments were passed into a regenerating bath which had the same composition and temperature as that of Example 1. After the usual finishing treatments, a filament bundle was obtained which presented the following characteristics:

| | |
|---|---|
| Filament reference | U |
| Total denier | 1900.0 |
| Filament number | 1100.0 |
| Conditioned tenacity, g./den. | 6.2 |
| Conditioned elongation, percent | 16.0 |
| Wet tenacity, g./den. | 4.8 |
| Wet elongation, percent | 18.0 |
| Loop tenacity g./den. (conditioned) | 1.3 |
| Work product: | |
| Conditioned | 99.0 |
| Wet | 86.0 |
| Orientation angle | 40 |
| Degree of organization | 0.47 |
| Water filtration number | 10 |
| Dyeing index | 1.1 |

If this yarn was subjected to a 15% stretch while it was still wet, a high tenacity yarn was finally obtained which presented the following qualities:

| | |
|---|---|
| Titer, denier | 1650 |
| Conditioned tenacity, g./den. | 7.2 |
| Wet elongation, percent | 9.0 |
| Work product (conditioned) | 64.0 |

It will thus be observed that in spite of the loss of energy produced in drawing, there is obtained a very high tenacity yarn for industrial applications without the use of formaldehyde in the spinning solution.

EXAMPLE 15

Exactly the same viscose is spun, in the same bath and exactly the same technological conditions as in Example 1, except that the filaments are retracted 18% in the relaxation bath, instead of 12% as described in Example 1, except that the filaments are retracted 18% in bath and submitted to the usual finishing treatment, whereby they showed the following properties:

| | |
|---|---|
| Filament reference | V |
| Titer, den. | 1.45 |
| Tenacity, conditioned, g./den. | 5.4 |
| Elongation, conditioned, percent | 20 |
| Wet tenacity, g./den. | 4 |
| Wet elongation, percent | 26 |
| Work product (tenacity×elongation), conditioned | 108 |
| Work product, wet | 104 |
| Loop tenacity, g./den. (conditioned) | 2 |
| Wet modulus: | |
| Elongation percent under a load of 0.5 g./den. | 3 |
| After action of 5% NaOH (elongation percent under a load of 0.5 g./den.) | 4.5 |
| Orientation angle | 45 |
| Organization degree | 0.45 |
| Water filtration number | 8 |
| Dyeing index | 1.15 |

EXAMPLE 16

Exactly the same viscose is spun, in the same bath, in exactly the same conditions as in Example 1, except that the filaments bundle is cut into fibers after the second stretching and that the resulting fibers are received on a moving screen belt where they are treated for about 20 seconds with a relaxation bath having the same composition and temperature as that of Example 1, and falling in rain from above the belt. They are then further treated with the same regeneration bath a sin Example 1. After finishing, the fibers showed the following properties:

| | |
|---|---|
| Filament reference | W |
| Titer, den. | 1.5 |
| Tenacity, conditioned, g./den. | 3.8 |
| Elongation conditioned, percent | 23 |
| Wet tenacity, g./den. | 2.8 |
| Wet elongation, percent | 31 |
| Work product (tenacity×elongation) conditioned | 87 |
| Work product, wet | 87 |
| Loop tenacity, g./den. (conditioned) | 2 |
| Wet modulus: | |
| Elongation, percent under a load of 0.5 g./den. | 3.7 |
| After action of 5% NaOH (elongation percent under a load of 0.5 g./den.) | 5.3 |
| Orientation angle | 47 |
| Organization degree | 0.43 |
| Water filtration number | 8 |
| Dyeing index | 1.1 |

EXAMPLE 17

Filaments D and F described in Examples 1 and 4 were acetylated in a conventional manner.

A bundle of 6,600 continuous filaments was passed in the state of secondary swelling, through an aqueous solution containing 500 g./liter of potassium acetate (catalyst) and thereafter the filament bundle was extracted, dried at 80° C. and passed through an acetylating chamber at the speed of 15 cm. per minute. An acetylating mixture of air and acetic anhydride in a gaseous phase, at a temperature of 125–130° C., was sent simultaneously in the chamber at the rate of about 3 liters per minute. After leaving the acetylating chamber, the filament bundle was rinsed in hot water, oiled and dried at 80° C.

The acetylated filaments D', D" and F' obtained from filaments D and F presented the characteristics indicated in Table XVII below, where they are compared with a usual triacetate filament. (Filament D' was acetylated by a discontinuous process and D" by a continuous process.)

TABLE XVIII

| | Filament D' | Filament D" | Filament F' | Triacetate filament |
|---|---|---|---|---|
| Acetylation ratio (AcOH percent/acetylated filament) | 53 | 53 | 53 | 61 |
| Swelling in water, percent | 18 | 19 | 18 | 13 |
| Titer, den | 2.2 | 2.2 | 4 | 2.8 |
| Conditioned tenacity, g./den | 4.1 | 5 | 3 | 1.3 |
| Wet tenacity, g./den | 3.1 | 3.6 | 2.3 | 0.7 |
| Conditioned elongation, percent | 15 | 14 | 27 | 40 |
| Wet elongation, percent | 19.6 | 17 | 38 | 43 |
| Wet modulus (elongation percent under a load of 0.5 g./den.) | 0.9 | 0.6 | 1.6 | 25 |
| Loop tenacity, conditioned g./den | 1.2 | 0.8 | 1.9 | 0.5 |

Moreover, it is already apparent from Table XIII that the novel acetylated filaments of the present invention make it possible to obtain yarns which have characteristics of tenacity, elongation, modulus and loop which are superior to those of corresponding triacetate spun yarns.

The good general properties of the acetylated filaments of the present invention are also evident at all stages subsequent to spinning, sizing and weaving, and in overall performance, as illustrated in Table XIV.

While preferred embodiments of the invention have been shown and described, it is to be understood that changes and variations may be made without departing from the spirit and scope of the invention as defined in the appended claims.

I claim:
1. In a process for the production of filaments of regenerated cellulose, the improvement which comprises spinning into a dilute acid spinning bath containing less than 25 g./liter sulfuric acid, sodium sulfate, and zinc sulfate in an amount of not over 2 g./liter, at a temperature below 40° C., a viscose which contains a cellulose whose DP is at least 400, having a gamma index of between 60 and 100 and a viscosity greater than 300 poises wherein gel filaments are produced, said gel filaments having a gamma index greater than 45 after they have emerged from the dilute spinning bath, then subjecting the gel filaments to a first 30–80% stretching operation outside the bath, and simultaneously subjecting said filaments to a squeezing action so as to remove from the gel filaments the adhering acid bath, the gamma index ($\gamma_1$) of the thus stretched and extracted gel filaments being between 28 and 40, their swelling index (G) being between 5 and 8, and the acid concentration ($a$) of the liquid extracted from the gel filaments at the end of the stretching operation and squeezing action between 6 and 9.5 g./liter, and thereafter subjecting said gel filaments to a second stretching operation in air, to a relaxation step, and finally to a setting operation.

2. The process according to claim 1 wherein the gamma index ($\gamma_1$), the swelling index (G) and the acid concentration ($a$) are related to each other by the formula:

$$18 < \left[\gamma_1 - \frac{a(G-1)}{3}\right] < 28$$

3. The process according to claim 1 wherein the squeezing action on the filaments to remove the acid that impregnates the same during the first 30–80% stretching operation is accomplished by friction stretching the filaments on fixed or moving guides, or rollers.

4. The process according to claim 1 wherein the gamma index ($\gamma_1$) of the 30–80% stretched and extracted gel filaments is between 32 and 36, the swelling index of the same gel filaments is about 6, and the acid concentration of the liquid extracted at the end of the first stretching operation and squeezing action is between 7.5 and 8 g./liter.

5. The process according to claim 1 wherein the 30–80% stretched and extracted gel filaments are subjected to a second 0 to 100% stretching operation in air resulting in filaments in a gel state having a residual gamma index ($\gamma_2$) between 18 and 28.

6. A process according to claim 1 wherein the setting step takes place in a hot dilute acid bath.

7. The process according to claim 5 wherein the gel filaments are subjected to a second 0–70% stretching operation in air.

8. The process according to claim 5 wherein the gel filaments are subjected to a second 70–100% stretching operation in air.

9. The process according to claim 5 wherein the 30–80% stretched and extracted gel filaments are subjected to a second 0–100% stretching operation in air, resulting in filaments in a gel state having a residual gamma index ($\gamma_2$) between 21 and 25.

10. A process according to claim 5 wherein the gel filaments which have been subjected to a first 30–80% stretching operation with squeezing action, and to a second 0–100% stretching operation in air, are thereafter relaxed in a dilute acid bath containing less than 2 g./liter sulfuric acid.

11. The process according to claim 5 wherein the filaments which have been subjected to a first 30–80% stretching operation and thereafter to a second 0–100% stretching operation, are cut into fibers which are then subjected to a relaxation step and to a setting operation.

12. The process according to claim 10 wherein the relaxation step takes place in a dilute acid bath whose temperature is comprised between 20° and 80° C.

13. The process according to claim 10 wherein the relaxation is comprised between 8 and 20%.

14. The process according to claim 13 wherein the gamma index of the filaments following the relaxation step is comprised between 6 and 14.

15. In a process for the production of filaments of regenerated cellulose, the improvement which comprises spinning into a dilute acid spinning bath containing less than 25 g./liter sulfuric acid, sodium sulfate, and zinc sulfate in an amount of not over 2 g./liter at a temperature below 40° C., a viscose which contains a cellulose whose DP is at least 400, having a gamma index of between 60 and 100 and a viscosity greater than 300 poises wherein gel filaments are produced, said gel filaments having a gamma index greater than 45 after they have emerged from the dilute spinning bath, then subjecting the gel filaments to a first 30–80% stretching operation outside the bath, and simultaneously subjecting the filaments to a squeezing action so as to remove from the gel filaments the adhering acid bath, the gamma index ($\gamma_1$) of the thus stretched and extracted gel filaments being between 28 and 40, their swelling index (G) being between 5 and 8, and the acid concentration ($a$) of the liquid extracted from the gel filaments at the end of the stretching operation and squeezing action being between 6 and 9.5 g./liter, and thereafter subjecting the extracted gel filaments to a second 0–100% stretching operation in air resulting in filaments in a gel state having a residual gamma index ($\gamma_2$) between 18 and 28, then relaxing the filaments of from 8 to 20% of their length in a dilute acid bath containing less than 2 g./liter of sulfuric acid at a temperature between 20 and 80° C., and finally completing the regeneration of the filaments in a hot dilute acid bath.

References Cited

UNITED STATES PATENTS

| | | |
|---|---|---|
| 2,699,983 | 1/1955 | Drisch. |
| 3,139,467 | 6/1964 | Drisch. |
| 3,324,216 | 6/1967 | Inoshita et al. _____ 264—197 |
| 3,341,645 | 9/1967 | Horiuchi et al. ____ 264—197 X |

JULIUS FROME, *Primary Examiner.*

J. H. WOO, *Assistant Examiner.*

U.S. Cl. X.R.

264—196, 198, 188, 195